Patented Apr. 26, 1949

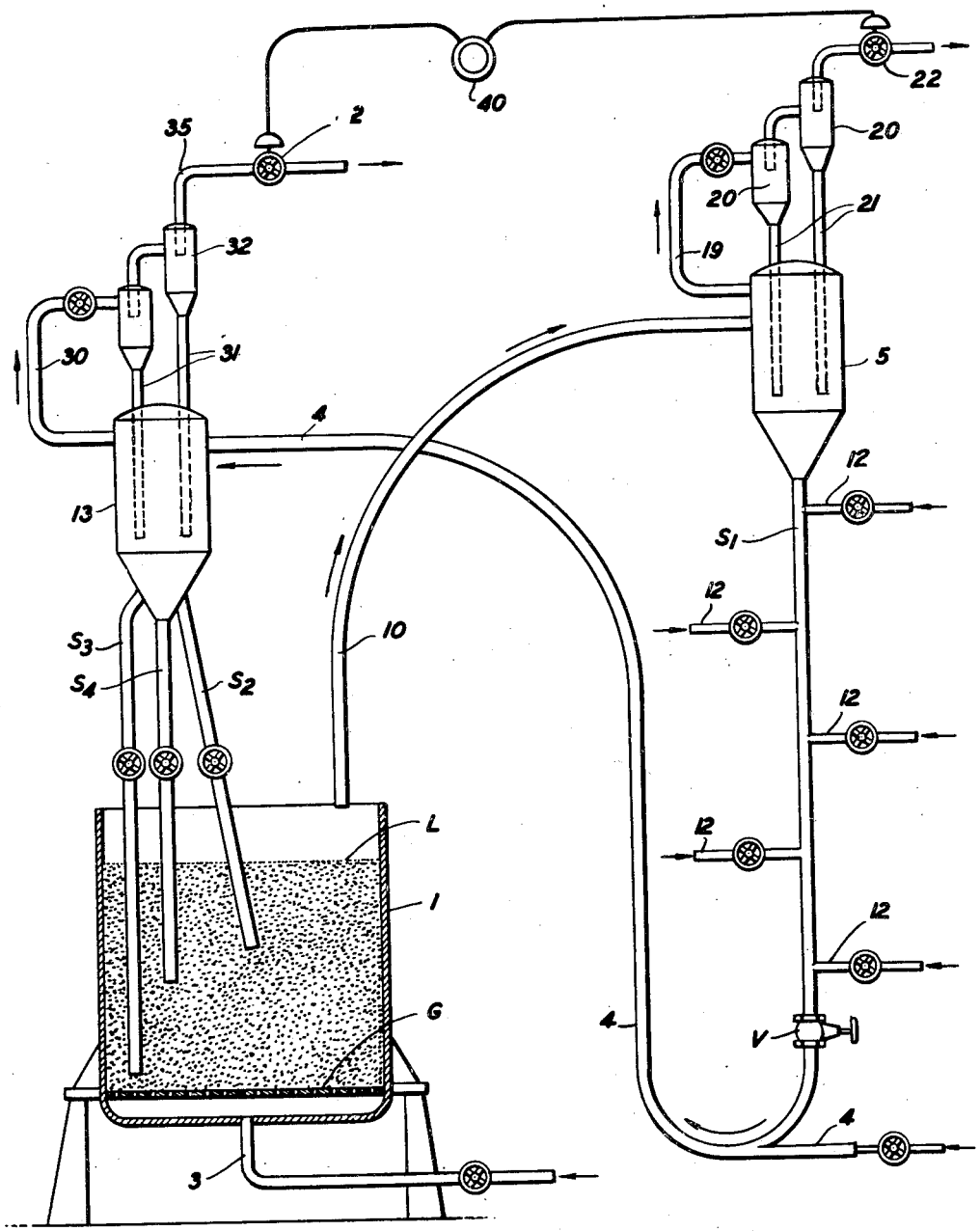

2,468,521

UNITED STATES PATENT OFFICE 2,468,521

HEAT CONTROL IN AN EXOTHERMIC REACTION

Sumner B. Sweetser and Lloyd B. Smith, Baton Rouge, La., assignors to Standard Oil Development Company, a corporation of Delaware Application April 17, 1946, Serial No. 662,906

8 Claims. (Cl. 260—449.6)

The novel features of our invention relate to a method of controlling the temperature in a fluidized bed of powdered catalyst in a reaction zone and in particular to a method of abstracting heat from a fluidized bed of catalyst contacting a gasiform material during an exothermic reaction.

Many chemical reactions take place in vapor phase, and in recent years there has been developed a so-called "fluid-solid technique" wherein when a vapor phase reaction requires a catalyst the same may often be utilized by suspending in powdered form in the gaseous reactants. In spite of the fact that a dense suspension of catalyst may be employed in a relatively slow moving gas in a reaction zone, excellent mixing and substantially uniform temperatures are maintained throughout the mass of catalyst; nevertheless, in reactions when heat is liberated it is necessary to abstract the heat to maintain the temperatures in the reaction zone within desired limits. In particular, in the catalytic synthesis of hydrocarbons from carbon monoxide and hydrogen performed in the presence of a fluid catalyst, the reaction is so highly exothermic that it is necessary to resort to cooling means to prevent undue temperature rises. Heretofore, and prior to this invention, it was common practice to cause a circulating fluid to flow in heat exchange with the fluid mass of catalyst in the reaction zone for the purpose of withdrawing heat therefrom and controlling temperatures. One method resorted to was to jacket the reaction zone and to cause a cooling fluid to flow through the jacket surrounding the reaction zone and by this means to withdraw heat. Other cooling means involved the deposition of tubes within the reaction zone through which tubes water or some other fluid was forced in heat exchange relation with the fluidized catalyst, whereby heat was absorbed and the temperature controlled thereby. The use of jacketed reaction vessels involves an added expense of appreciable size when employed in connection with a full scale commercial reactor, and they are therefore undesirable from the standpoint of economy. And, of course, by the very nature of this type of cooling, it is difficult to maintain uniform temperature throughout the mass of catalyst when the reaction zone has a diameter of, say, 10 to 15 feet more or less. Of course, the actual cooling effect takes place at the perimeter of such a reaction zone, and there is an appreciable temperature difference between the center of the mass and those regions at the perimeter, in spite of the fact that good mixing is provided by the fluid state of the catalyst. Another proposal involves the deposition of tubes within the reactor, but these tubes are apt to interfere with the successful fluidization of the catalyst mass by physical hindrance as a result of the piling up of powdered catalyst on the tube walls or headers and is otherwise unsatisfactory.

According to our present improvements, we maintain uniform temperatures within the reaction zone without resorting to jacketing vessels or cooling tubes deposed within the reaction zone in a manner which will presently be described.

From the foregoing it is obvious that the object of our invention is to control the temperatures prevailing in a vapor phase reaction where a catalyst is suspended in said vapors without resorting to the use of cooling tubes or providing jacketed reaction vessels.

Other and further objects of the invention will appear in the following more detailed description.

In the accompanying drawing, we have shown diagrammatically a fragment of a hydrocarbon synthesis unit employing the fluid catalyst technique, the drawing depicting the reaction zone and merely so much of the accessory apparatus as are necessary to illustrate the novel features of our invention.

Referring in detail to the drawing, 1 represents a hydrocarbon synthesis reactor containing a fluid bed of catalyst, say an iron catalyst in powdered form having a size of from 5 to 300 microns. A mixture of carbon monoxide and hydrogen enters the system through line 3 and is thereafter forced into the bottom or reactor 1 where it passes upwardly through a grid or screen G and thence into a body of fluid catalyst maintained in that state by limiting the superficial linear velocity of flowing gas within the range of, say, 0.25 to 3.0 feet per second, preferably about 0.4 foot per second, so that the catalyst forms a dense suspension in the reactants, which suspension will have a density amounting to 30 to 90% of its free settling or bulk density. By maintaining a temperature of 550° to 650° F. within the reaction zone, a pressure of 0 to 450 pounds per square inch, and a feed rate of from 300 to 3000 V/V/hr., the reaction is caused to take place with the formation of hydrocarbons including those boiling in the gasoline and gas oil range. Up to this point, the description of the process is the same as that employed prior to our present improvements.

Our present improvements, in brief, consist of mixing with the catalyst a quantity of inert solid powder having a much smaller particle size and preferably a lower density than the catalyst so that it passes out of the reactor, is cooled and returned thereto, while the larger particles of catalyst remain in the reaction zone. In order to ensure that an adequate amount of the finely divided inert material is entrained in the vapors passing overhead, it is desirable to use somewhat higher linear velocities in the reactor than are used in conventional fluid synthesis. For example, the superficial linear velocity in the reactor may be from about 0.5–5.0 feet per second, and preferably from about 1.0–2.0 feet per second. If the catalyst is, say, metallic iron and the superficial velocity of the vapors is 1.5 feet per second, the catalyst will form a dense suspension having an upper level at some point L, above which the concentration of active catalyst in the vapors decreases. As indicated, the finer particles of inert material are "blown" out of the reactor or, more scientifically speaking, they are removed by elutriation and passed overhead through pipe 10 with the gaseous products into a solids-gas contacting device 5 where at least a rough separation of solid and gas is effected, the solids passing downwardly through a standpipe $S_1$. The standpipe $S_1$ is provided with taps 12 through which a gas may be injected for the purpose of increasing the fluidity of the downflowing inert diluents therein. The standpipe is controlled by a slide valve V; and the downflowing inert powder is admitted in measured quantities into a pipe 4 containing flowing water. Since the temperature of the inert solid is about reaction temperature, upon contact with the water the latter is vaporized and the steam thus formed serves to carry the fine, inert solids via pipe 4 into a second solids-gas contacting device 13 wherein the steam is separated from the inert solids and the latter are thereafter returned by a second standpipe $S_2$ into the reaction zone 1 shown in the drawing. But the cooling effect caused by contacting the hot inert solids with water in line 4 decreases the temperature of the inert solids and when they are re-introduced into the reaction zone they will, of course, lower the temperatures therein prevailing. In the drawing we have shown three standpipes $S_2$, $S_3$ and $S_4$ connecting the bottom of separator 13 with the reactor with said standpipes discharging into different sections of reactor 1 in order to assist in maintaining a uniform temperature within said reactor. A greater or lesser number of these standpipes could be used. The return of the cooled, inert powder to the reaction zone comprises a cooling cycle, and by controlling the amount of solids thus circulating any desired temperature can be maintained in the reaction zone. The rate of circulation of the inert powder can be controlled to a considerable extent by the superficial linear velocity maintained in the reactor.

Referring again to solids-gas contacting device 5, the gases or vapors exit from 5 via line 19 and thence pass through a plurality of centrifugal separators 20 for the purpose of removing entrained fines which are returned to the system through dip legs 21 and thereafter the product is delivered by line 22 to purification and recovery equipment (not shown) where the desired products such as gasoline and gas oil are recovered by fractionation and/or condensation according to known methods. In like manner, the steam separated from the solids in gas-contacting device 13 issues through line 30 and passes through one or more centrifugal separators 32 wherein entrained solids are separated and the steam substantially freed of solids issues from the present system through line 35 and the separated solids are returned through dip legs 31. The steam, of course, may be utilized in a waste heat boiler or other equipment (not shown) to recover at least a portion of its energy content. Furthermore, in order to maintain the system in balance with respect to pressure, the pressure control device 40 is provided and suitably connected, preferably through electrical means, with valves 42 and 44 disposed in lines 35 and 22, respectively.

As inert material we may use powdered alumina, fuller's earth, clay, silica gel or any other inert material of relatively low density which can be prepared in finely divided form. As indicated previously, the inert material is used in more finely divided form than the catalyst so that by differences in both particle size and density, the catalyst is selectively retained in the bottom part of the reactor while the inert material is concentrated in the upper part of the reaction zone. A suitable particle size distribution for the inert material is from 1 to 50 microns when used with a catalyst having an average particle size from about 50 to 300 microns, preferably from 150–250 microns. The proportion of inert material to catalyst may be from about 20% to 200% by weight of the catalyst, this proportion being lower in the case of non-supported type catalysts which are generally of relatively high density than for supported type catalysts which are generally of lower density. Also, instead of contacting the inert material in line 4 with water, some other cooling medium may be used as a vaporizable hydrocarbon, say a light naphtha fraction. Any inert material and any cooling fluid may be used, provided they do not react with each other, are not highly corrosive, not too expensive, nor otherwise undesirable. If desired indirect heat exchange as in the tube type heat exchanger may be used in place of direct heat exchange by contact with a vaporizable liquid.

To recapitulate briefly, our present invention relates to a convenient, effective and inexpensive method of controlling temperatures in the reaction zone containing a body of fluidized powdered catalyst suspended in vaporous reactants. The invention contemplates mixing a finely divided catalyst for an exothermic reaction with an inert finely divided solid of smaller average particle size than the catalyst so that the particles of inert material under the conditions of operation continuously pass out of the reaction zone with the product, are separated therefrom, cooled by contact with a vaporizable liquid, and after separation from the last-named vapors, returned to the reaction zone. We are aware that prior to our invention, the temperature in a fluid catalyst reactor had been controlled by circulation of the catalyst itself through heat exchange systems for the purpose of supplying or abstracting heat from the reaction zone but we are not aware that the temperature in a fluid type reactor has been controlled previously by circulation of a powdered solid through the catalyst in the reaction zone without removal of the catalyst itself therefrom.

To illustrate the operation of our invention a fluid type hydrocarbon synthesis reactor containing 100 cubic feet of an iron catalyst having a density of 150 pounds per cubic foot utilizes 45,000 cubic feet per hour of a synthesis gas containing 45% carbon monoxide. With 95% conversion of the carbon monoxide the heat liberated amounts to approximately 2,640,000 B. t. u. per hour. When clay with a specific heat of 0.25 is used as the diluent for the catalyst, it is necessary to circulate approximately 34,000 pounds per hour of clay between a temperature of 600° F. in the reactor and a temperature of 250° F. in the cooler for the inert material to transfer all of the heat of reaction to the vaporized liquid. If the iron catalyst is mixed with 25% by weight of the clay, the desired amount of cooling is obtained by circulation of the clay approximately nine times per hour in a complete cycle through the cooling system.

Little if any catalyst is removed from the reactor according to our process because of its greater size and density, and therefore it is desirable as a best operation to select an inert solid varying considerably in particle size and density from the catalyst. A sintered or fused iron catalyst is particularly desirable for this type of operation because of the large differential in density between the iron and the common inert materials such as clay, silica gel, and other siliceous materials. Of course, it should be pointed out that in the hydrocarbon synthesis it may be necessary to remove the catalyst as well as the inert solids periodically to wash the same for the purpose of removing wax contaminants. When this is required the catalyst may be withdrawn from the bottom of the reactor through a standpipe (not shown in the drawing), treated by conventional means for removal of contaminants, and returned to the reactor. The catalyst withdrawn in this manner will be admixed with only relatively small amounts of the inert diluent.

Numerous modifications of our invention will be apparent to those familiar with the art without departing from the spirit thereof.

What we claim is:

1. The method of controlling temperature in the bed of fluidized powdered catalytic material admixed with a gasiform material undergoing an exothermic reaction in a reaction zone which comprises continuously adding to the said bed a powdered inert material cooled to a temperature not exceeding about 350° F. below the reaction temperature in an amount sufficient to maintain reaction temperature at a desired level, the said inert material being added at least in part to a lower portion of the bed of the catalytic material whereby heat is abstracted from said bed of catalytic material, in a region of maximum heat liberation continuously removing by elutriation powdered inert material substantially free of catalytic material from an upper portion of said bed of catalytic material, cooling the thus removed inert material to the extent indicated and returning the latter to said bed of catalytic material.

2. The method set forth in claim 1 in which the inert material withdrawn is cooled by contact with a vaporizable liquid.

3. The method set forth in claim 1 in which said inert material is of smaller size than said catalytic material.

4. The method set forth in claim 1 in which the said inert material has a lower specific gravity than said catalytic material.

5. The method set forth in claim 1 in which the withdrawn inert material is cooled by contact with water.

6. The method set forth in claim 1 in which the inert material is cooled by contact with water causing vaporization of the said water and return in suspension of the steam thus formed to a zone in communication with the said fluidized bed of catalytic material.

7. The method set forth in claim 1 in which the amount of cooled inert material returned to the fluidized bed of catalytic material is from about 20 to 200% of the latter.

8. The method set forth in claim 1 in which a hydrocarbon synthesis process is conducted employing hydrogen and carbon monoxide as reactants in the presence of a powdered iron catalyst.

SUMNER B. SWEETSER.
LLOYD B. SMITH.

REFERENCES CITED

The following references are of record in the file of this patent:

UNITED STATES PATENTS

| Number | Name | Date |
| --- | --- | --- |
| 2,393,636 | Johnson (1) | Jan. 29, 1946 |
| 2,393,909 | Johnson (2) | Jan. 29, 1946 |
| 2,396,109 | Martin | Mar. 5, 1946 |